US009276905B2

(12) United States Patent
Coker, II et al.

(10) Patent No.: US 9,276,905 B2
(45) Date of Patent: Mar. 1, 2016

(54) ATTESTATION ARCHITECTURE AND SYSTEM

(75) Inventors: George S. Coker, II, Westminster, MD (US); Amy L. Herzog, Pebble Beach, CA (US); Joshua Guttman, Newton Centre, MA (US); Peter A. Loscocco, Glenwood, MD (US); Jonathan K. Millen, Concord, MA (US); John D. Ramsdell, Andover, MA (US); Ariel Segall, Arlington, MA (US); Justin Sheehy, Waltham, MA (US); Brian T. Sniffen, Cambridge, MA (US); Grant Wagner, Columbia, MD (US)

(73) Assignee: The MITRE Corporation, McLean, VA (US)

( * ) Notice: Subject to any disclaimer, the term of this patent is extended or adjusted under 35 U.S.C. 154(b) by 1225 days.

(21) Appl. No.: 12/032,190

(22) Filed: Feb. 15, 2008

(65) Prior Publication Data

US 2010/0031047 A1    Feb. 4, 2010

(51) Int. Cl.
*G06F 11/00* (2006.01)
*G06F 12/14* (2006.01)
*G06F 12/16* (2006.01)
*G08B 23/00* (2006.01)
*H04L 29/06* (2006.01)

(52) U.S. Cl.
CPC ....... *H04L 63/0281* (2013.01); *H04L 2209/127* (2013.01)

(58) Field of Classification Search
CPC . H04L 9/2371; H04L 9/3234; H04L 63/0876; H04L 2209/127
USPC .......... 726/1, 22, 26; 713/151–153, 164–167, 713/187, 193, 194
See application file for complete search history.

(56) References Cited

U.S. PATENT DOCUMENTS

| | | | | |
|---|---|---|---|---|
| 7,634,807 | B2 * | 12/2009 | Yan et al. | 726/22 |
| 2005/0132202 | A1 * | 6/2005 | Dillaway et al. | 713/179 |
| 2005/0221766 | A1 * | 10/2005 | Brizek et al. | 455/73 |

(Continued)

OTHER PUBLICATIONS

"Property Attestation—Scalable and Privacy-friendly Security Assessment of Peer Computers"; dated May 10, 2004, pp. 1-16; J. Poritz, M. Schunter, E. Herreweghen, M. Waidner.*

(Continued)

*Primary Examiner* — Ashok Patel
*Assistant Examiner* — Daniel Potratz
(74) *Attorney, Agent, or Firm* — Sterne, Kessler, Goldstein & Fox P.L.L.C.

(57) ABSTRACT

An architecture and system are provided for flexible, composable attestation systems. Systems built according to this attestation architecture can be composed to accomplish complex attestation scenarios. The system is designed around composable components to permit flexible recombination. A system, method, and computer program product are provided for proving attestations to an appraiser regarding a target system. In an embodiment, an attestation request is sent from an appraiser to a target system, wherein the attestation request includes queries regarding properties of the target system needed by the appraiser to make trust decisions regarding the target system. The attestation request is forwarded from the target system to an attester which collects the requested data. The attester sends an attestation response to the appraiser, wherein the response includes at least information regarding properties of the target system requested by the appraiser in order to make a trust decision regarding the target system.

26 Claims, 8 Drawing Sheets

(56) References Cited

U.S. PATENT DOCUMENTS

| | | | | |
|---|---|---|---|---|
| 2005/0251857 | A1* | 11/2005 | Schunter et al. | 726/16 |
| 2007/0101138 | A1* | 5/2007 | Camenisch | 713/168 |
| 2008/0015808 | A1* | 1/2008 | Wilson et al. | 702/123 |
| 2008/0046752 | A1* | 2/2008 | Berger et al. | H04L 9/3271 713/186 |
| 2008/0288783 | A1* | 11/2008 | Jansen et al. | 713/189 |

OTHER PUBLICATIONS

"Property Attestation—Scalable and Privacy-friendly Security Assessment of Peer Computers"; dated May 10, 2004, pp. 1-16; J. Poritz, et al.*

Aboda et al., "Extensible Authentication Protocol (EAP)," RFC 3748 (Proposed Standard), Jun. 2004, http://www.ietf.org/rfc/rfc3748.txt.

AMD Corporation. AMD64 architecture programmer's manual vol. 2: System programming rev 3.11, Jan. 2006.

Chen et al., "A protocol for property-based attestation." In *STC '06: Proceedings of the first ACM workshop on Scalable trusted computing*, pp. 7-16, New York, NY, USA, 2006, ACM Press.

Guttman et al., "Programming cryptographic protocols." In Rocco De Nicola and Davide Sangiorgi, editors, *Trust in Global Computing*, No. 3705 in LNCS, pp. 116-145. Springer, 2005.

Guttman et al., Trust management in strand spaces: A rely-guarantee method. In David Schmidt, editor, *Programming Languages and Systems: 13th European Symposium on Programming*, No. 2986 in LNCS, pp. 325-339. Springer, 2004.

Guttman, Joshua, "Authentication tests and disjoint encryption: a design method for security protocols." *Journal of Computer Security*, 12(3/4):409-433, 2004.

Haldar et al., "Semantic remote attestation—a virtual machine directed approach to trusted computing." In *Proceedings of the Third virtual Machine Research and Technology Symposium*, pp. 29-41. USENIX, May 2004.

Intel Corporation. Intel trusted execution technology, Nov. 2006.

Katsuno et al., Layering negotiations for exible attestation. In *STC '06: Proceedings of the first ACM workshop on Scalable trusted computing*, pp. 17-20, New York, NY, USA, 2006. ACM Press.

Loscocco, P. and Smalley, S., "Integrating flexible support for security policies into the linux operating system." Technical report, NSA, NAI Labs, Apr. 2001.

Microsoft Corporation. NGSCB official page. http://www.microsoft.com/resources/ngscb/default.mspx, 2007.

Millen et al., "Call by contract for cryptographic protocols." In FCS-ARSPA, 2006.

Petroni et al., "Copilot—a coprocessor-based kernel runtime integrity monitor." In *USENIX Security Symposium*, pp. 179-194. USENIX, 2004.

Poritz, Johnathan, "Trust[ed][in] computing, signed code and the heat death of the internet." In SAC '06: *Proceedings of the 2006 ACM symposium on Applied computing*, pp. 1855-1859, New York, NY, USA, 2006. ACM Press.

Sadeghi, Ahmad-Reza and Stuble Christian, "Property-based attestation for computing platforms: caring about properties, not mechanisms." In *NSPW '04: Proceedings of the 2004 workshop on New security paradigms*, pp. 67-77, New York, NY, USA, 2004. ACM Press.

Seshadri et al., "Pioneer: Verifying code integrity and enforcing untampered code execution on legacy systems." In *Proceedings of ACM Symposium on Operating Systems Principles (SOSP)*, pp. 1-16, Oct. 2005.

Seshadri, Arvind, "Pioneer web page." http://www.cs.cmu.edu/~arvinds/pioneer.html, Apr. 2011.

Shi et al.," BIND: A time-of-use attestation service for secure distributed systems." In *Proceedings of IEEE Symposium on Security and Privacy*, May 2005.

Shieh et al., Nexus: a new operating system for trustworthy computing. In *SOSP '05: Proceedings of the twentieth ACM symposium on Operating systems principles*, pp. 1-9, New York, NY, USA, 2005. ACM Press.

TCG Best Practices Group. *Design, Implementation, and Usage Principles for TPM-Based Platforms*, Dec. 2005. Version 2.0.

Trusted Computing Group. *TCG Trusted Network Connect TNC IF-IMC*, May 2006. Version 1.1.

Trusted Computing Group. *TCG Trusted Network Connect: TNC Architecture for Interoperability*, May 2006. Version 1.1.

Trusted Computing Group. *TCG Trusted Network Connect TNC IF-IMC Specification*, version 1.1 edition, 2006.

* cited by examiner

ATTESTATION ARCHITECTURE AND SYSTEM

STATEMENT UNDER MPEP 310

The U.S. Government has a paid-up license in this invention and the right in limited circumstances to require the patent owner to license others on reasonable terms as provided for by the terms of CE-COM contract W15P7T-05-C-F600 awarded by the National Security Agency.

BACKGROUND OF INVENTION

1. Field of the Invention

The present invention relates generally to network security and, more particularly, to attestation of properties of a remote system.

2. Description of the Background Art

A principal goal in trusted computing is to provide a user, resource owner, or service provider with reliable knowledge about a system. Through evaluation of the identity and integrity of a system, evidence is produced that the target will not engage in some class of misbehaviors.

Current attestation systems are components of computer systems that permit reliable statements of evidence about those systems to be conveyed to remote parties, including other computers. Through evaluation of the identity and integrity of a system, evidence is produced that the target will not engage in defined classes of misbehaviors. An example of a current attestation system is the remote attestation system developed by the Trusted Computing Group (TCG). The TCG introduced the Trusted Platform Module (TPM) and the associated concept of remote attestation. Remote attestation may be used to address a number of trust problems ranging from guaranteed invocation of software, delivery of premium content to trusted clients, assuaging mutual suspicion between clients, and more. As the requirements of applications cannot be known a priori, attestation systems and measurement systems alike must be flexible, providing for privacy, completeness of measurement, and trust in the basic collection and reporting mechanisms.

Existing attestation systems are narrowly focused and generally aimed at specific use-cases and therefore typically lack flexibility to address more general attestation problems. Further, existing definitions of attestation focus primarily on describing specific, narrow, and particular properties desirable in those use-cases.

Existing attestation definitions primarily focus on describing the particular properties desirable in limited, specific use-cases. Current attestation systems are created to work with one particular measurement system targeting one particular system of interest.

What is needed is an attestation architecture and system to enable trust in systems that are not monolithic and are made up of diverse hardware and software platforms. Also, each party to a given system's attestation desires its own measurements of its peers and themselves. A property that is sufficient for one party to use as evidence for a trust decision may not be for another; a set of information one user has no problem providing might cause privacy concerns for another. These varying needs are directly driven by what each party has at stake. The more one has to lose by inappropriate disclosure or incomplete knowledge, the stricter one's needs will be regarding privacy or complete measurement. Parties with strong demands of each other regarding authentication and measurement may be willing to give up more of their own private information in order to achieve their goals.

Accordingly, what is desired are attestation architectures and systems that are flexible enough to accommodate varying concepts of attestation. What is further needed are attestation systems designed around composable components that permit a flexible recombination of components to meet new needs. What is desired is an attestation architecture that can be used to design attestation systems which handle complex attestation scenarios and provide more complete attestation than is currently achievable.

SUMMARY OF INVENTION

Flexible methods, systems, and computer program products for performing attestation systems are disclosed. A flexible attestation architecture is disclosed. Systems built according to the architecture can be composed to accomplish complex attestation scenarios and to provide more complete attestation than is currently achievable. An attestation system that fulfils the requirements of the attestation architecture is disclosed.

In accordance with the methods and systems disclosed herein, it is not the attestation target which reports that its operating system kernel is unmodified. Instead, some distinct measurement component examines the attestation target and reports truthfully on the target no matter what the target reports about itself (i.e., the target is specifically not trusted).

The attestation system can be composed to accomplish complex attestation scenarios. The system is designed around composable components, permitting a flexible recombination to meet new needs. An open-ended framework for attestation is provided for safe support to sensitive or high-value activities on heterogeneous networks. An architecture for attestation is provided with a system implementation that adheres to this architecture.

Briefly stated, according to an embodiment, an attestation request is sent from an appraiser to a target system, wherein the attestation request includes queries regarding properties of the target needed by the appraiser to make trust decisions regarding the target system. The attestation request is forwarded from the target system to an attester which resides on the same physical host as the target and collects the data requested in the attestation request. The attester then sends an attestation response to the appraiser, wherein the response includes at least information regarding properties of the target system requested by the appraiser in order to make a trust decision regarding the target.

Trust decisions in the system are made by an appraiser that can support an access request made on behalf of the target system. These trust decisions are typically decisions about the expected behavior of the target. To enable decisions to be made on this basis, an attestation system is provided wherein an appraiser is provided with a significant amount of information including the knowledge that the state of the target is such that it will not transition into an unacceptable state while the appraiser still continues to trust it.

Attestation is the activity of making a claim to an appraiser about the properties of a target by supplying evidence which supports that claim. An attester is a party performing this activity. An appraiser's decision-making process based on attested information is appraisal. In the most commonly addressed class of attestations, each attestation provides a means for appraisers to infer that the target of the attestation will not engage in a class of misbehaviors. For example, if the target reports that its operating system kernel is unmodified, the attester has reason to trust reports from the target, and some appraiser trusts information provided by the attester, then that appraiser can infer that the target will not engage in misbehaviors that might have occurred had the target's kernel been corrupted at the time of its measurement. The broader point of view makes a rich understanding of the related concepts of system measurement, attestation protocols, and system separation vital to successful attestation. Here there is a distinction between the measurement of a target system (the evidence) and the attestation itself.

To measure a target means to collect evidence about it through direct and local observation of it. Attestation about a target system will report measurements or conclusions inferred using measurements and possibly also other attestations.

Evidence may be attested to in a number of equivalent but semantically different forms depending on the attestation scenario. For example, the attestation may report raw evidence as directly observed, as reduced evidence (e.g. a hash of the raw evidence), or by substitution with a credential provided by a third party evaluator of the raw evidence. For example, an SSL certificate authority consumes many attestations as to the identity and practices of a target, and then produces a certificate attesting to the quality of a target. Also, a given target may wish to provide different information to different appraisers depending on the current trust relationships it has with those parties. A worthwhile desire in developing an attestation system is to resolve the mutual tension as well as possible given the contradictory nature of the parties' interests. In accordance with an embodiment of the invention, the appraiser demands frequent repeated attestations, re-evaluating its trust decisions often. The frequent repeated attestations are necessary because while it is possible to determine that a party will be sufficiently trustworthy for the 15 minutes (or other time period) after performing a given attestation, it is sometimes not feasible to determine that it will be so for a day. In accordance with another embodiment of the invention, the repeated attestations are repeated periodically at regular or irregular intervals.

The invention also includes a computer program product comprising a computer usable medium having computer program logic recorded thereon for enabling a processor to accomplish complex attestation scenarios. The computer program logic includes code to perform system attestation based upon properties of the target system instead of attestation based solely upon system identity.

The invention additionally includes a system capable of handling complex attestation scenarios. The system includes a first appraiser module to appraise targets, a second communication module to send and receive attestation requests and responses to between an appraiser and a target, a third target module to receive attestation requests, and a fourth attester module to receive and process attestation requests from a target.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention.

Figure 1:
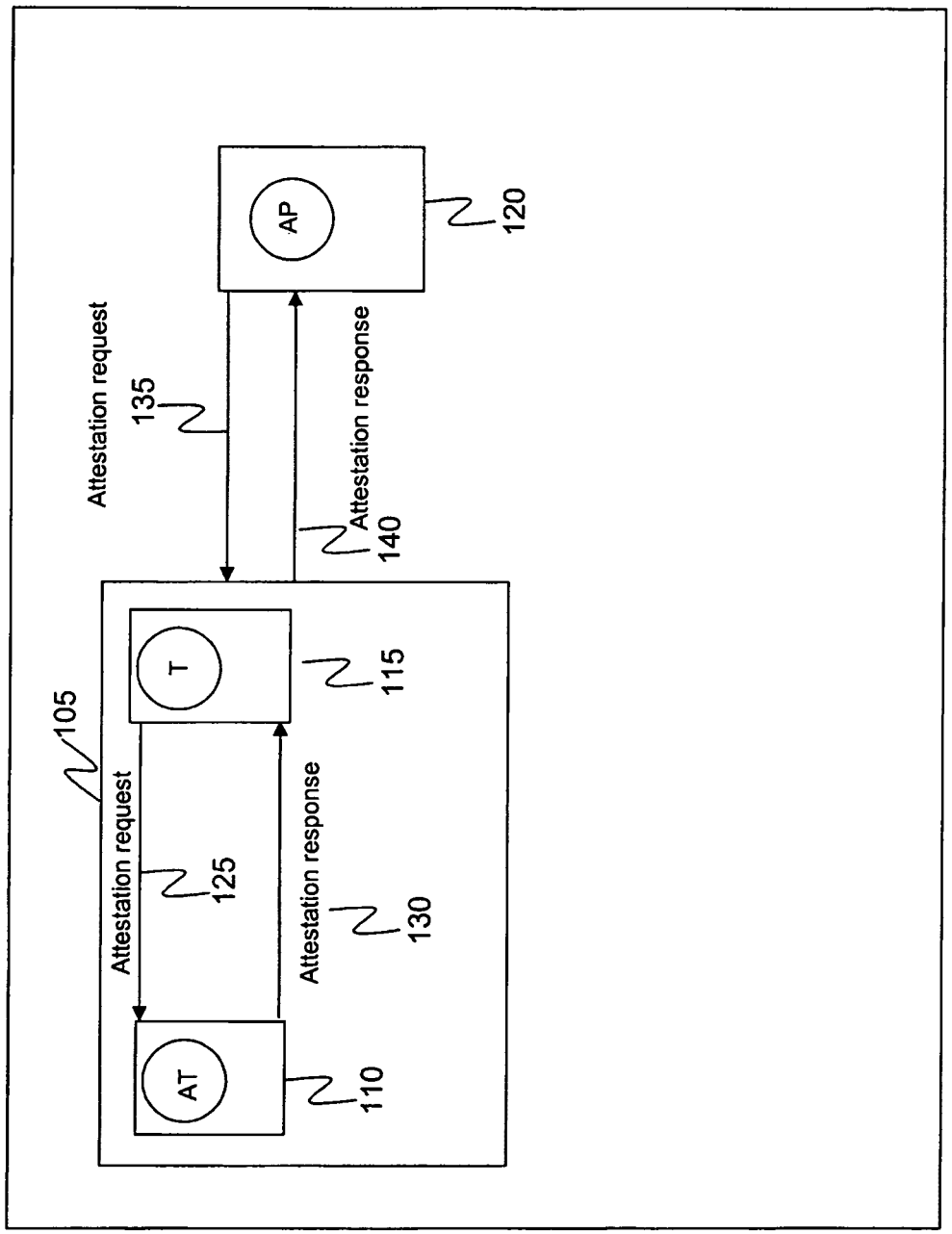
FIG. 1 illustrates an example attestation scenario.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. Embodiments of the present invention are described primarily in the context of attestation targets, attesters, appraisers, intermediate attesters, attestation requests, attestation responses, and hosts wherein targets and attesters reside.

II. Attestation Scenarios

Attestation scenarios are exchanges between principals in attestation systems. These scenarios are used to illustrate security properties that are not explicit properties of the principals but rather the exchanges between the principals.

An exemplary attestation scenario is described in co pending U.S. patent application entitled, "Attesting to Properties of Measurements of a Remote System Without Providing Knowledge of the State of the Measured System," Ser. No. 12/173,229 (now U.S. Pat. No. 8,422,683, issued on Apr. 16, 2013), by Sniffen et al., filed concurrently herewith and incorporated in its entirety herein by reference.

FIG. 1 depicts an example attestation scenario. Attestation system 100 contains Target system (T 115), Attester (AT 110), and Appraiser (AP 120). Target system 115 and attester 110 reside on the same physical host 105, but there is a separation property causing them to be effectively different principals. Appraiser 120 demands attestation from target system 115 by sending attestation request 135. Target system 115 via attestation request 125 asks attester 110 to examine target system 115 and collect information requested in attestation request 135. After gathering information necessary to fulfill attestation request 135, attester 110 produces attestation 130 reflecting the examination of parts of target system 115. This attestation is given back to target system 115 in attestation 130 that is resistant to tampering by target system 115. In accordance with an embodiment of the invention, attestation responses 130 and 140 can be secured with a digital signature from attester 110. For example, in an embodiment, attestation responses 130 and 140 may include a digital signature from attester 110 so that appraiser 120 is confident that the response came from attester 110. In an embodiment of the present invention, attestation response 140 sent from target system 115 to appraiser 120 may contain a subset of information contained in attestation response 130 that was sent from attester 110 to target system 115. For example, in an embodiment, information in attestation response 130 identifying attester 110 may be removed from attestation response 140 before response 140 is sent to appraiser 120. In accordance with another embodiment, response 140 may be a forwarded copy of response 130 that contains identical information.

Target system 115 forwards attestation response 140 to appraiser 120 that sent attestation request 135. In an embodiment of the present invention, attestation response 140 may be encrypted to ensure privacy. Details such as the specific contents of request 135 and response messages 130 and 140 will be apparent to those skilled in the relevant art. For an attestation to be believable, the measurements used to root the attestation must be produced by a trustworthy mechanism. Attester 110 is subject to the specific measurement requirements of appraiser 120, and the only option for attester 110 to preserve privacy is to opt out entirely if attester 110 does not wish to fulfill request 135. It is difficult in a simple attestation scenario depicted in FIG. 1 for attester 110 to verify the identity of a party such as appraiser 120 that will receive attestation measurements in attestation response 140. Appraiser 120 cannot simply ask target system 115 about itself, as the purpose of the process depicted in attestation scenario 100 is to determine whether or not to trust target system 115. It is not plausible to deal with attestation for making trust decisions without considering the examiner/attester 110 as a party separate from target system 115.

Figure 2:
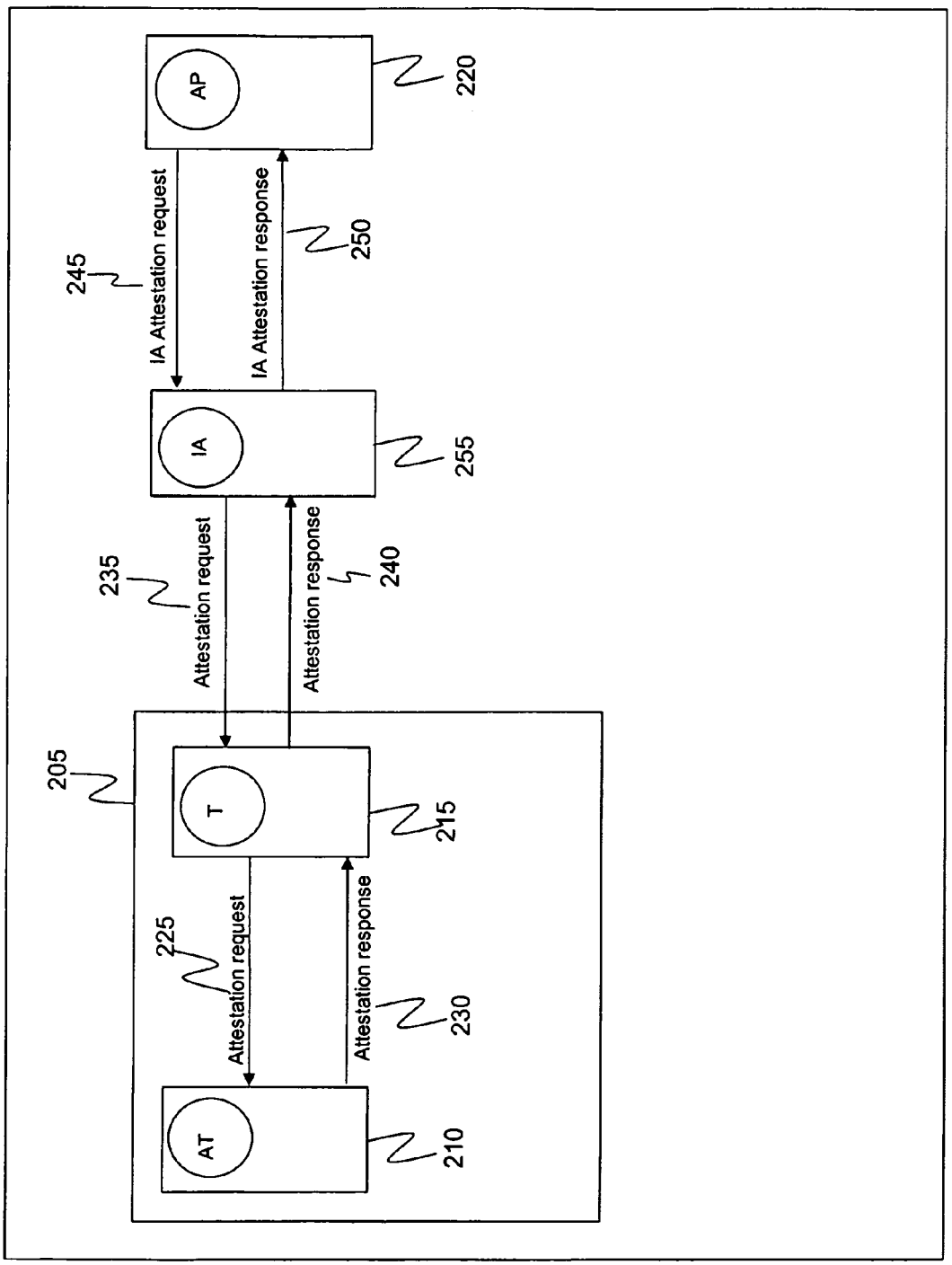
FIG. 2 illustrates a complex attestation scenario, in accordance with an embodiment of the present invention.

FIG. 2 depicts a more complex attestation scenario 200 in accordance with an embodiment of the present invention. Scenario 200 shares some elements with scenario 100 depicted in FIG. 1, but also includes intermediate attester IA 255. If target system 215 wishes for another party such as appraiser 220 to make trust decisions about 215 without having to directly disclose measurements, this can be achieved by introducing a new party, in this case intermediate attester (IA 255), that is trusted by target system 215 for privacy and is trusted by the receiver, appraiser 220, for integrity. FIG. 2 does not depict how the trust party appraiser 220 is established, but it could be via another attestation as shown in FIG. 1, or any other well known means acceptable to the respective parties.

Attestation system 200 contains target system (T 215), attester (AT 210), intermediate attester (IA 255), and appraiser (AP 220). Target system 215 and attester 210 reside on the same physical host 205, but there is a separation property causing them to be effectively different principals. In accordance with an embodiment of the present invention, appraiser 220 demands attestation from target system 215 by sending intermediate attestation request 245 to intermediate attester 255. In this example, intermediate attester 255 then sends target system 215 attestation request 235. In an embodiment of the present invention, attestation request 235 sent from intermediate attester 255 to target system 215 may contain a subset of information contained in intermediate attestation request 245 that was sent from appraiser 220 to intermediate attester 255. For example, in an embodiment, information in intermediate attestation request 245 identifying appraiser 220 may be removed from intermediate attestation request 245 before attestation request 235 is sent to target system 215. In accordance with another embodiment, request 235 may be a forwarded copy of request 245 that contains identical information.

In accordance with an embodiment of the present invention, target system 215 then asks via attestation request 225 attester 210 to examine target system 215 parts and characteristics to gather information requested in attestation request 235. In an embodiment of the present invention, attestation request 225 sent from target system 215 to attester 210 may contain a subset of information contained in attestation request 235 that was sent from intermediate attester 255 to target system 215. For example, in an embodiment, information in attestation request 235 identifying intermediate attester 255 may be removed from attestation request 225 before it is sent from target system 215 to attester 210. In accordance with another embodiment, request 225 may be a forwarded copy of request 235 that contains identical information.

After collecting information necessary to fulfill attestation request 235, attester 210 produces attestation response 230 reflecting the examination of parts of system 215. This attestation is given back to target system 215 in attestation response 230 that is resistant to tampering by target system 215. In accordance with an embodiment of the invention, attestation 230 can be secured with a digital signature from attester 210. Target system 215 forwards attestation response 240 to intermediate attester 255 that sent request 235. In an embodiment of the present invention, attestation response 240 may be modified to ensure privacy. For example, in an embodiment, attestation response 240 may be encrypted to prevent unauthorized access by parties other than intermediate attester 255. In an embodiment of the present invention, attestation response 240 sent from target system 215 to intermediate attester 255 may contain a subset of information contained in attestation response 230 that was sent from attester 210 to target system 215. For example, in an embodiment, information in attestation response 230 identifying attester 210 may be removed from attestation response 240 before response 240 is sent to intermediate attester 255. In accordance with another embodiment, response 240 may be a forwarded copy of response 230 that contains identical information.

Intermediate attester 255 then sends IA attestation response 250 to appraiser 220. According to an embodiment of the invention, IA attestation response 250 may be a modified version of attestation response 240 that removes some details regarding target system 215. For example, in an embodiment, attestation response 240 may include detailed platform and host-specific measurements for target system 215, while IA attestation response 250 sent to appraiser 220 may be as simple as an intermediate attester-signed and time-stamped message claiming that target system 215 has certain abstract properties that appraiser 220 needs to know in order to trust target system 215. Details such as the specific contents of requests 225 and 235; and response messages 240 and 250 will be apparent to those skilled in the relevant art.

More particularly, in scenario 200, attestation response 240 from target system 215 is sent to intermediate attester 255, which performs an appraisal and then produces a new attestation response 250 which can be sent to appraiser 220.

According to an embodiment of the present invention, the appraisal may be performed by examining evidence about past or future behavior of the target system 215. For example, in an embodiment, the appraisal may be based on the state of programs installed and running on the target, changes during execution of programs, and measurements related to the hardware and software components that comprise target system 215.

In this example, the original attestation response 240 sent to intermediate attester 255 may include detailed platform and host-specific measurements of target system 215, while the modified attestation response 250 sent to AP 220 may be as simple as an intermediate attester-signed and time-stamped message effectively claiming that target system 215 has some given abstract property that appraiser 220 requires in order to trust target system 215. Scenario 200 solves a privacy problem from the point of view of target system 215. Scenario 200 also enables parties such as appraiser 220 to make trust decisions without knowing all of the individual details of target system 215 necessary to perform the right concrete local measurements on all remote parties that they may wish to trust. This "nesting" of attestations is a very powerful idea which can be used to introduce a great deal of flexibility in an attestation system. SSL certificate authority is an example of nested attestation. A SSL certificate authority is similar to the intermediate attester 255 party depicted in FIG. 2, but SSL certificate authority operates offline and not online as intermediate attester 255 does.

Scenario 200 and the trust management under it abstracts away from the specifics of the properties desired and achieved by principals such as intermediate attester 255, appraiser 220, and target system 215. This abstraction allows for easy development and analysis of a number of flexible attestation scenarios to cover most common cases. Scenarios 100 and 200 are illustrative examples, and do not encompass all possible attestation interactions.

In accordance with an embodiment of the present invention, the information about target system 215 provided in attestation response 240 reflects the running system on target system 215, rather than just images about target system 215 stored on disk. While some measurement tools may collect and deliver start-up time information about a target such as target system 215, others will need to inspect the current state of an active target. The attestation architecture provided herein ensures that such tools have access to the live state of the target. The architecture cannot predict the uses to which appraisers will put the information it delivers. Appraisers may need to make very different decisions, and in order to justify the decisions, appraisers such as appraiser 220 need to make different predictions about the future behavior of targets such as target system 215.

The ability to compose scenarios such as 100 and 200 and measurement services in a flexible way to meet dynamic needs is more valuable from the point of view of attestation architecture than having a specific known set of possible known interactions. Trust engineering can become very complex, and that complexity is much more difficult to manage if one must start anew for each situation instead of just finding a set of pre-existing building blocks and composing them.

III. Attestation System

Figure 3:
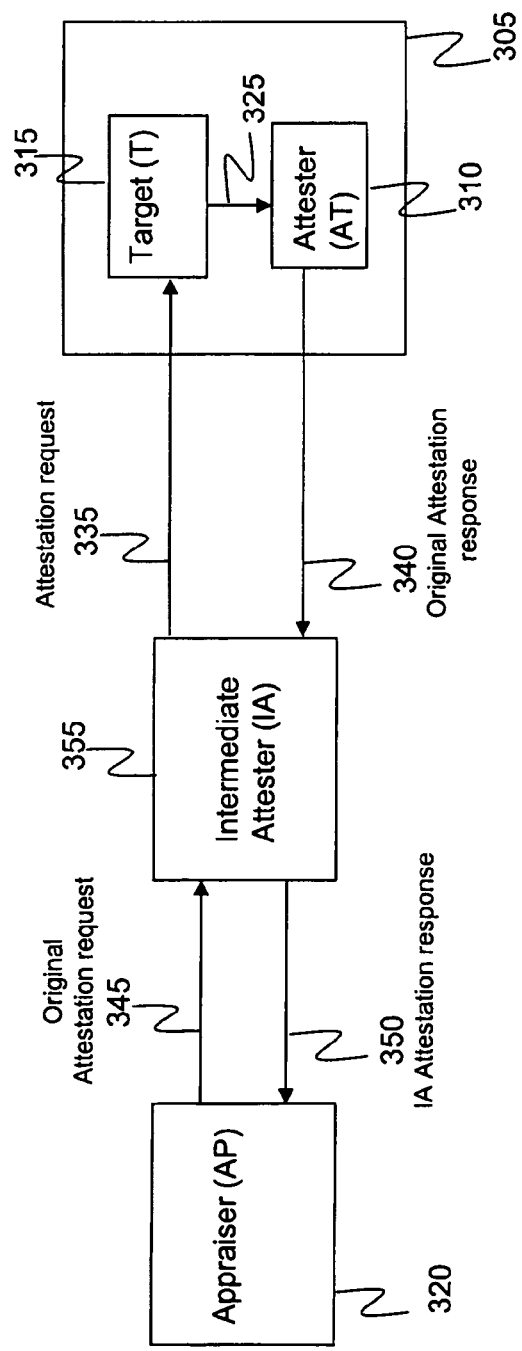
FIG. 3 illustrates an attestation system, in accordance with an embodiment of the present invention.

FIG. 3 is an attestation system 300 where an appraiser 320 is operable to make some determination regarding whether to trust target system 315. In order to accomplish this, appraiser 320 submits an original attestation request 345 to intermediate attester 355, in accordance with an embodiment of the present invention. Upon receipt of original attestation request 345, intermediate attester 355 sends attestation request 335 to target system 315.

In accordance with an embodiment of the present invention, original attestation request 345 may contain different information that what is contained in attestation request 335 so that information about appraiser 320 is excluded from attestation request 335 that is sent to target system 315. In accordance with another embodiment of the present invention, original attestation request 345 and attestation request 335 may be encrypted to ensure privacy of information contained within the requests.

After target system 315 receives attestation request 335, the request is forwarded to attester 335 as request 325, in accordance with an embodiment of the present invention. In accordance with an embodiment of the present invention, attestation request 325 may contain different information that what is contained in attestation request 335 so that information about intermediate attester 355 is excluded from request 325 that is sent to attester 310. For example, in an embodiment, request 325 may contain a subset of information in request 335 with some information about intermediate attester 355 is excluded from request 325 sent to attester 310. Attester 310 is operable to determine system information regarding target system 315 and to transmit that information to intermediate attester 355 in attestation response 340.

Attester 310 may be provided to target system 315 by an adversary (e.g., appraiser 320 or intermediate attester 355). In accordance with an embodiment of the present invention, attester 310 is installed on the same platform 330 as target system 315 prior to the initiation of any communications with intermediate attester 355. In accordance with an additional embodiment of the present invention, appraiser 320 or intermediate attester 355 provides attester 310 to platform 330 upon initiating communications including attestation request 335. This example embodiment is described herein solely for purposes of illustration, and not limitation.

In accordance with an embodiment of the present invention, attester 310 sends original attestation response 340 to intermediate attester 355. Intermediate attester 355 receives response 340 and sends attestation response 345 to appraiser 320.

In accordance with an embodiment of the present invention, original attestation response 340 may contain different information that what is contained in attestation response 345 so that some information about target 335 is excluded from the intermediate attester attestation response 350 that is sent to appraiser 320. In accordance with another embodiment of the present invention, original attestation response 340 and intermediate attester attestation response 350 may be encrypted to ensure privacy of information contained within the responses.

In accordance with an embodiment of the invention, original attestation request 345 may be routed directly from appraiser 320 to target system 315 without being sent to or modified by intermediate attester 355. In accordance with another embodiment of the invention, original attestation response 340 may be routed directly from attester 310 to appraiser 320 without being sent to or modified by intermediate attester 355.

Figure 4:
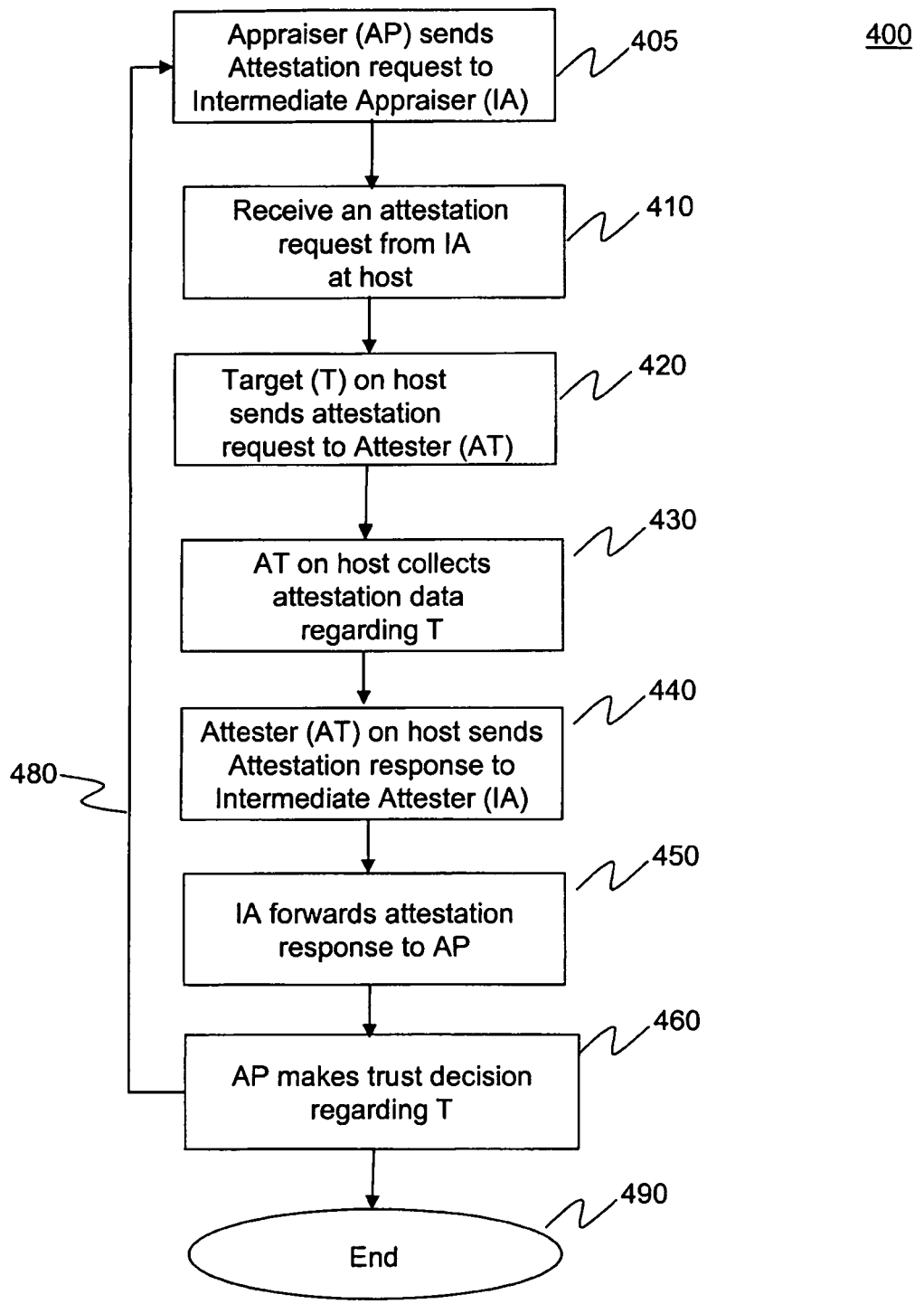
FIG. 4 is a flowchart illustrating steps by which an attestation system processes and provides attestation information to an appraiser, in accordance with an embodiment of the present invention.

FIG. 4 is a flowchart 400 illustrating steps by which an attestation system, such as system 300 depicted in FIG. 3 provides attestation information to appraiser 320, according to an embodiment of the present invention.

More particularly, flowchart 400 illustrates the steps by which the target sends attestation information to the appraiser for its use to make trust decisions regarding the target. Flowchart 400 is described with reference to the embodiment of FIG. 3. However, flowchart 400 is not limited to that example embodiment. Note that the steps in the flowchart do not necessarily have to occur in the order shown.

The method begins at step 405 where an Appraiser (AP 320) sends an attestation request to an intermediate attester (IA 355).

In step 410, attestation request 335 from the intermediate attester 335 is received at a host containing the target of the attestation.

In step 420, target system 315 sends attestation request 325 to an attester 310 residing on host 305.

In step 430, attester 310 collects attestation data regarding target system 315.

In step 440, attester 310 sends original attestation response 340 from host 305 to intermediate attester 355. As discussed above, original attestation response 340 sent in this step may be digitally signed by attester 310.

In step 450, intermediate attester 355 sends intermediate attester attestation response 350 to appraiser 320. As discussed above, intermediate attester attestation response 350 forwarded in this step may be a modified version of original attestation response 340.

In step 460, appraiser 320 makes a trust decision regarding target system 315 based at least on information contained in intermediate attester attestation response 350.

In accordance with an embodiment of the invention, the appraiser may demand frequent or periodic repeated attestations, re-evaluating its trust decisions regarding target system 315. The repeated attestations are accomplished by executing step 480 to repeat steps 410-460. For example, in an embodiment, step 480 is executed causing steps 410-460 to be repeated periodically at regular or irregular intervals.

After a trust decision has been made by appraiser 320 and no re-evaluations are needed, the method ends at step 490.

IV. Attestation Architecture

In accordance with an embodiment of the present invention, an attestation architecture is described herein that is capable of delivering comprehensive information about a target. The architecture enables attestations regarding a target's full internal state to be made accessible to local measurement tools without a loss of privacy for users of the target platform. An object of the present invention is to avoid subjecting the target platform to attack by sending attestation responses that disclose un-patched vulnerabilities to an adversary.

According to an embodiment of the present invention, the target is able to enforce a policy governing which measurements of itself are sent to any given appraiser. Hence, the attestation architecture provided herein allows the appraiser to be identified to the target. This attestation policy may distinguish kinds of information that may be delivered within attestation responses to different appraisers. According to an additional embodiment of the present invention, the attestation policy may be dynamic, relying on current run-time information for individual disclosure decisions. For example, in an embodiment, a decision to disclose information may require that the appraiser provide an attestation to the target about its own state.

According to an embodiment of the present invention, the semantic content of attestations is explicit. For example, in an embodiment, the identity of the target is explicitly represented in a form that the appraiser can use to determine whether a number of different attestations concern the same target. According to an embodiment of the present invention, the appraiser is able to infer consequences from a number of different attestations. For example, when several measurements are needed in order to make a prediction about the behavior of the target, an appraiser can infer consequences from these several measurements of the target. According to the attestation architecture provided herein, the semantics of individual attestations are uniform, and they are composable using valid logical inferences.

According to an embodiment of the present invention, the attestation mechanism itself is able to provide the appraiser with evidence that individual attestations are reliable. For example, the attestation architecture is identified to the appraiser and target. As would be recognized by persons of skill in the art, there may be variations in how different systems fulfill the requirements of the attestation architecture disclosed herein. These variations may arise due to limited forms of evidence available regarding a target which may suffice for an appraiser, or evidence that has aged to an extent that it may be older than what would normally be accepted. When different degrees of adherence to the architecture elements are designed into a system, then the variation is static. When the system adjusts at run-time to provide different degrees of evidence in different situations, or when different peers are the appraiser, then the variation is dynamic.

An attestation system designed according to the attestation architecture must have the following capabilities. The attestation system:

a) measures diverse aspects of the target of attestation;

b) has separate domains to ensure that the measurement tools can prepare their results without interference from the (possibly unreliable) target of attestation;

c) protects itself or a core trust base with the domain separation mechanism by ensuring that it cannot be weakened without this fact being evident from the content of attestations; and d) delegates attestation by having attestation proxies collect detailed measurements, convincing evidence, and summarizing the measurements and evidence to selected peers, when a target does not permit the full facts to be widely shared; and manages attestation to handle attestation queries by invoking suitable measurement tools, delivering the results to the appraiser or a proxy as constrained by policies.

A. Measurement Tools

Providing comprehensive information about a system requires the ability to provide a collection of measurement tools that jointly and comprehensively measure a target. Comprehensive measurement of a system requires more than simply the ability to read all of the data contained in that system. It also means that some measurement tools must understand the structure of what they are measuring. For example, merely scanning and hashing memory used by a target's operating system kernel may be insufficient to provide useful measurements of the target. Usefulness is judged in terms of the appraiser's needs, and typically involves evidence about the past or future behavior of the target. The state of a program changes during execution, and therefore cannot be measured by simple hashing. For this reason, measuring complex system components requires knowing the structure of the targets. Some trust decisions require these structure-sensitive measurements. Different measurement tools must be produced for measuring components with different structure. Thus, the complete set of such tools that will be desired is not knowable ahead of time without restricting the target systems from ever adding any new future applications. The attestation architecture disclosed herein supports a collection of specialized measurement tools, and in order to be able to provide evidence for arbitrary future attestations it also supports adding new tools to the collection over time. In addition to measurement capacity being comprehensive, freshness of target attestation information is also supported by the architecture. Measurements cannot always be performed a priori because appraisers must be able to measure various parts of a target system on demand. These demands are made from the point of view of an appraiser. The attestation architecture presented herein enables a remote party to trigger measurement; as it is insufficient to only have runtime measurement occur via periodic automatic re-measurement triggered by the measurement system or tools.

B. Domain Separation

In accordance with an embodiment of the invention, a domain separation mechanism separates the attestation manager from the target and the measurement tools. According to an embodiment of the present, invention domain separation may be achieved by a hardware component that provides runtime measurements of the domain separation mechanism.

For a measurement tool to provide information about a target of attestation, the measurement tool must be able to deliver accurate results even when the target is corrupted. The measurement too must first have access to the target's state so as to be able to distinguish whether that target is corrupted or uncorrupted. This state includes the target's executable code but also modifiable data structures that determine whether its future behavior will be acceptable. The measurement tool's state must also be inaccessible to the target, so that even if the target is corrupted, it cannot interfere with the results of the measurement. According to an embodiment of the invention, this separation is achieved by virtualizing the target, so that the measurement tool runs in a separate virtual machine (VM) from the target. The virtual machine monitor must then be able to control visibility across multiple virtual machines so that the measurement tool has read access to the target. It must also ensure that the target does not have any control over the measurement tool. There may be a message-passing channel established between them, but the hypervisor/VMM must be able to ensure transparent visibility of the measurement tool into the target and protection of those tools from the target.

C. Self-Protecting Trust Base

To achieve domain separation it is necessary in order to have trust in attestations and specifically in the integrity of the measurement tools. The attestation system's trust comes from components which are simple enough or sufficiently evaluated so that one can be convinced that they do not require re-measurement after they have been running. Part of this core includes the hardware used as a Trusted Computing Base. Any other component must either be measurable from a place that it cannot control or must be sufficiently measured via a static startup measurement taken before it begins operating. The self-protecting trust base is more than just a trusted static subset of a system. The trust base is sufficiently simple and static so that re-measurement is not required, but also is also sufficiently rich to bootstrap measurements and attestations. Anything performing measurement and attestation on the platform will in turn require measurement and attestation about itself in order to convince an appraiser of its trustworthiness. It must be ensured that this chain "bottoms out" at something sufficient to perform certain essential measurements and attestations to support the chain above it while being simple enough that static startup-time measurements are sufficient to determine trust. The content of this static trust base must be determined.

D. Attestation Proxies

In accordance with an embodiment of the invention, the appraiser delegates many aspects of determining the quality of the target to specialists called attestation proxies. Insight into the state of the target is made available by the proxies while also allowing a target to choose and enforce a policy on the disclosure of information about its state. This is accomplished by allowing an appraiser and target to agree on an attestation proxy that is partially and mutually trusted by both the appraiser and target. According to an embodiment of the present invention, the target is configured to trust the proxy to disclose only information about its state which is of limited sensitivity. For example, the appraiser may trust the proxy to make statements only when they are warranted by appropriately fresh and comprehensive information about the target. Proxies can function as specialists acting on behalf of the appraiser. Expertise is needed to interpret detailed measurements, such as those needed to predict behavioral properties about an operating system. An appraiser may get more reliable information and more usable information from an attestation proxy than it would be able to extract on its own from the comprehensive data. According to an embodiment of the present invention, maintainers of an attestation proxy ensure that it has up-to-date information about the strengths and weaknesses of specific system versions or configurations.

E. Protocols

Delegations to attestation proxies require protocols that allow the principals to ensure they are communicating with appropriate proxies. These protocols must supply the principals with messages that unambiguously answer the principals' queries. Any well known communication protocol can be used. These delegations, combined with attestations fulfilling architecture requirements discussed above, enable a powerful new attestation capability.

An appraiser may compose separate layered or orthogonal attestations, involving different proxies, in order to make a judgment.

F. Attestation Manager

The attestation architecture presented herein is flexible and systems built according to the architecture respond meaningfully to different requests from different appraisers without knowing or having pre-arranged what every possible combination of attestations might be. The architectural component referred to as the Attestation Manager enables this flexibility. The Attestation Manager component contains a registry of all of the measurement and attestation tools currently on the platform, and a description of the semantic content produced by each. This component can select at runtime the appropriate services needed to answer any query which could be answered by some subset of the measurement and attestation capabilities currently on the system. The Attestation Manager is involved in nearly every remote attestation, and it also enforces the constrained disclosure called for by the architecture. The Attestation Manager can restrict the services it selects based on the identity of the party the information would be released to, according to locally-stored access policies. In order to defend this capability from both the untrusted target of attestations and also from potentially-vulnerable measurement tools, the Attestation Manager is protected via domain separation.

Attestation responses use cryptography (i.e., encryption) in order to protect communications from adversaries. This same protection, taken together with domain separation, means that the target can be safely used as an intermediary for communication with appraisers or proxies. This leads to the very beneficial result that an Attestation Manager can be a purely local service; it does not need to be directly accessible by any remote parties.

Figure 5:
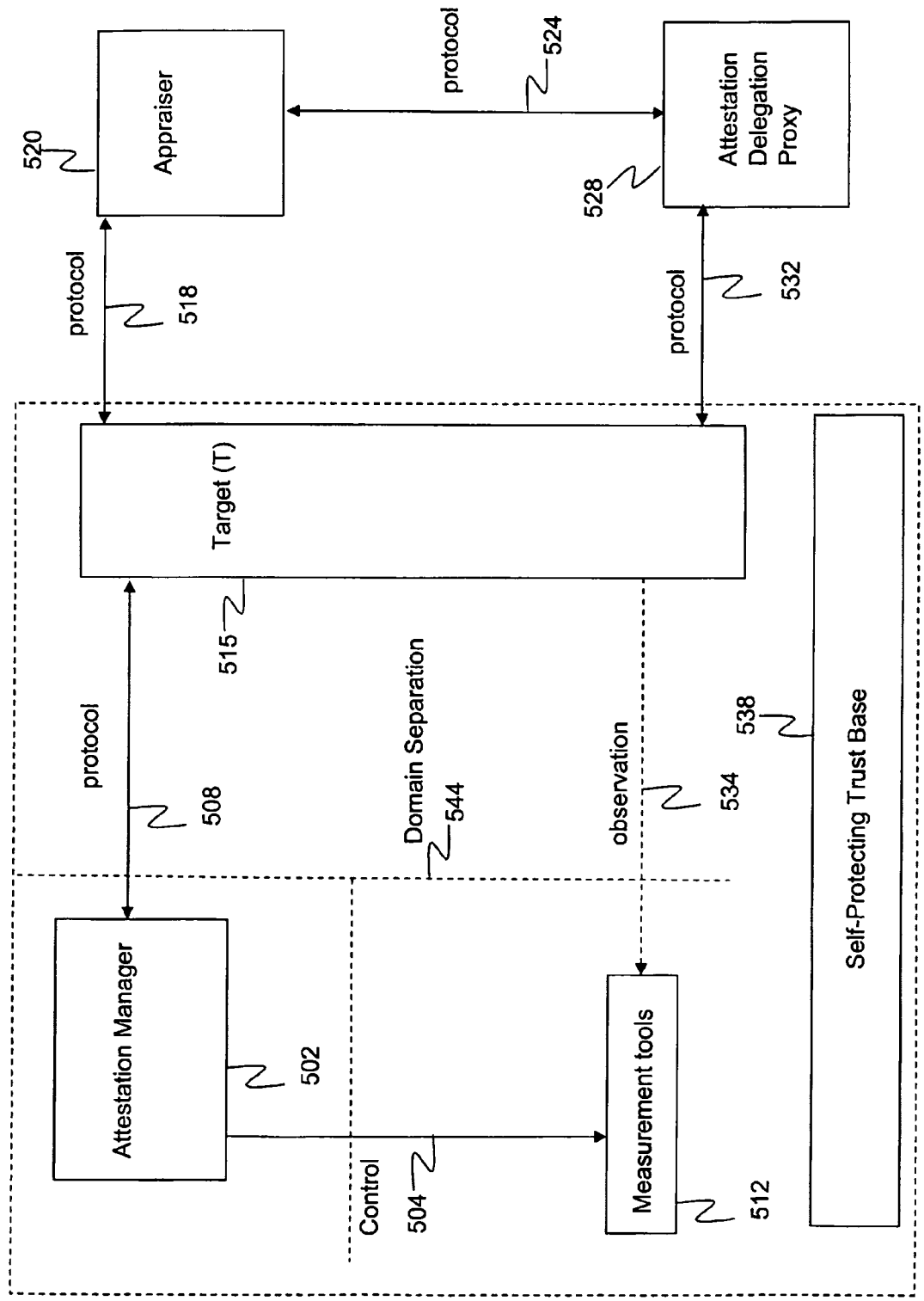
FIG. 5 illustrates the elements of an attestation architecture, in accordance with an embodiment of the present invention.

FIG. 5 illustrates the elements of an attestation architecture, in accordance with an embodiment of the present invention. Attestation manager 502 communicates with target system 515 via protocol 508. Attestation manager 502 is protected by domain separation 544 and sends control information 504 to measurement tools 512. Target system 515 communicates with appraiser 520 via protocol 518. In an embodiment of the present invention, target system 515 sends attestation requests. For example, in an embodiment, with reference to FIG. 2, attestation request 225 may be sent to appraiser 220 using protocol 518. Appraiser 520 communicates with attestation delegation proxy 528 via protocol 524. Attestation proxy 528 communicates with target system 515 via protocol 532. In an embodiment of the present invention, attestation delegation proxy 528 sends attestation responses, such as attestation response 230 depicted in FIG. 2, to target system 515 using protocol 532. Target system 515 then sends observation 534 to measurement tools 512. In an embodiment of the present invention, observation 534 may contain an attestation response. For example, in an embodiment, with reference to FIG. 2, attestation response 240 may be sent using protocol 518. Self-protecting trust base 538 includes at least hardware that is used as the platform's Trusted Computing Base. In an embodiment of the present invention, self-protecting trust base 538 is composed of components which are simple enough or sufficiently evaluated so that principals such as attestation manager 502 and target system 515 can be convinced that they do need to re-measure the components after they have been running.

Figure 6:
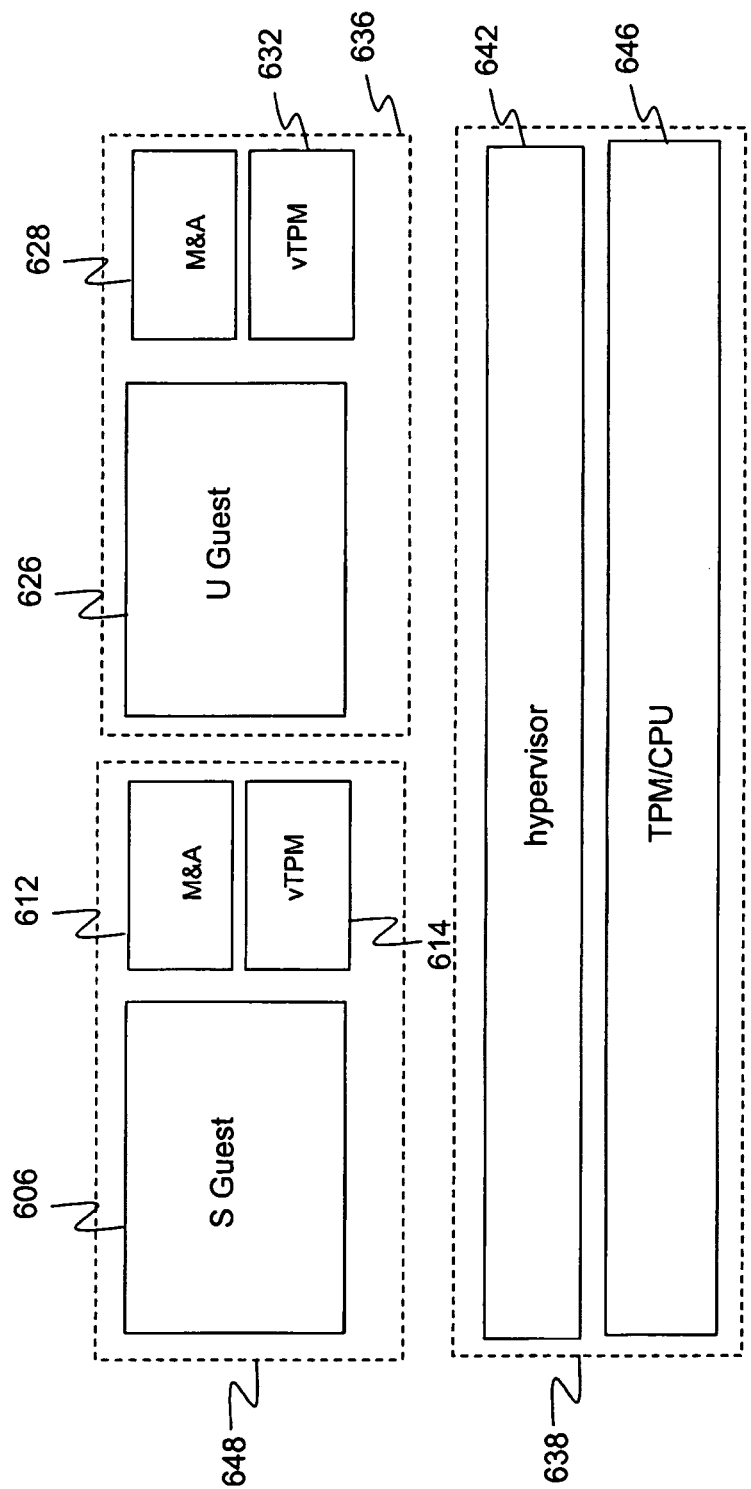
FIG. 6 illustrates a composable attestation platform, in accordance with an embodiment of the present invention.

FIG. 6 illustrates the attestation architecture implemented as a composable attestation platform 600, in accordance with an embodiment of the present invention. Hypervisor 642, together with TPM/CPU 646, serves self-protecting trust base 638. The representation in FIG. 6 is abstract, as the implementation of the attestation architecture is not tied to features specific to any one virtual machine monitor or microprocessor. Supervisor guest (S guest 606) contains the platform support package. User guest (U guest 626) runs the user's "normal" operating system.

Virtualized TPM (vTPM 614) hardware resource provides TPM capabilities for both the Supervisor 648 and User 636 environments. Both environments possess measurement and attestation services ("M&A"). M&A service 612 is part of supervisor environment 648 and M&A service 628 is part of user environment 636.

The construction and operation of hypervisor 642 and each guest (e.g., supervisor guest 606 and user guest 626) coincides with the collection of evidence reportable in attestations of the platform. Multiple, separate M&A capabilities are needed because evidence reported from a single party such as supervisor guest 606 or user guest 626 may not be sufficient. For example, in an embodiment, with reference to FIG. 1, user M&A service 628 may act as the target system 115 role, and supervisor M&A service 612 may act as the attester 110 role.

To manage a diversity of measurement and attestation requirements, virtual machine (vTPM 632) is dedicated to measurement and attestation (M&A) of a guest.

Hypervisor 642 is integral to self-protecting trust base 638. Hypervisor 642 controls sharing and provides domain separation for the system.

Separation of the M&A 628 and user guest 626 elements is transparent to the target system and the attester. For example, in an embodiment, with reference to FIG. 1, target system 115 and attester 110 does not view M&A service 628 as a separate entity from user guest 626. User guest 626 directs or routes proxy responses from M&A service 628 back to appraisers. For example, in an embodiment, with reference to FIG. 1, M&A service 628 routes attestation response 140 to appraiser 120.

In order to thoroughly or deeply assess platform 600, one may need to connect attestations together across the supervisor 648 and user 636 environments. The need for thorough or deep platform assessment can be satisfied with semantically explicit attestations as previously discussed.

Figure 7:
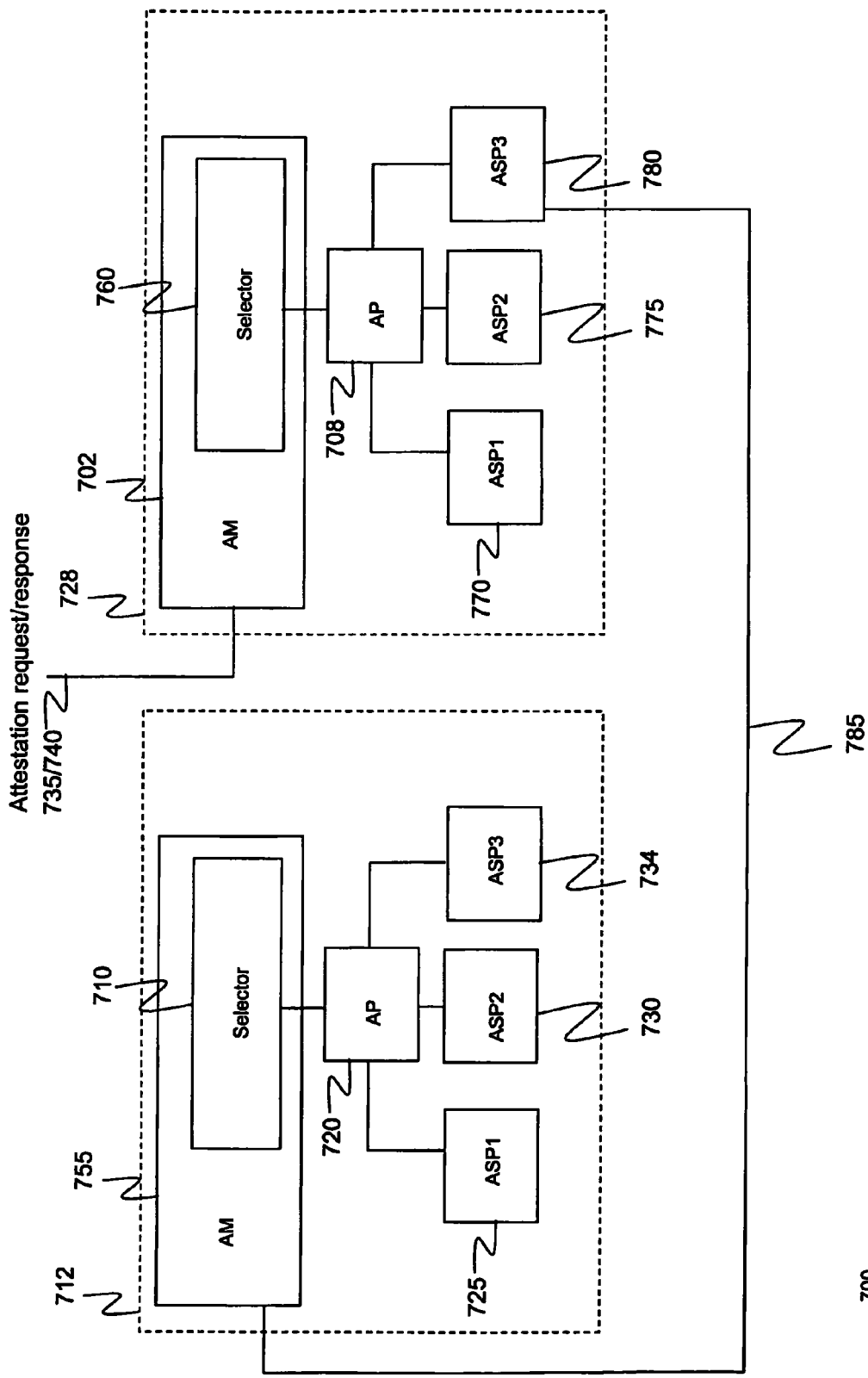
FIG. 7 illustrates a composable Measurement and Attestation (M&A) architecture, in accordance with an embodiment of the present invention.

FIG. 7 illustrates a composable Measurement and Attestation (M&A) architecture 700, in accordance with an embodiment of the present invention. With continued reference to FIG. 6, M&A 612 and M&A 628 include three components: attestation manager (AM 705), attestation protocols (AP 720 and AP 765), and attestation service providers (ASP1 725, ASP2 730, ASP3 734, ASP1 770, ASP2 775, and ASP3 780).

Attestation manager 702 manages the attestation session, listening for incoming attestation request 735, and using a subcomponent, selector 760 for initiating attestation protocol 765. An attestation protocol such as AP 765 is a running instance of an attestation protocol initiated by selector 760 in response to attestation request 740.

Attestation service providers (ASP1 725, ASP2 730, ASP3 734, ASP1 770, ASP2 775, and ASP3 780) are subcomponents of attestation protocols. In this specific example, attestation service providers ASP1 725, ASP2 730, and ASP3 734 are subcomponents of attestation protocol 720; and attestation service providers ASP1 770, ASP2 775, and ASP3 780 are subcomponents of attestation protocol 708. Each attestation service provider performs a well-defined service in the attestation protocol and as defined serve a critical role in satisfying attestation architecture requirements for the platform. With continued reference to FIG. 6, ASP1 725, ASP2 730, and ASP3 734 are integrity measurement systems, wrappers for calls to TPM 646, vTPM 614, vTPM 632, or invocation of other services.

As a result of separating key services into attestation protocols 708 and 720 which may be used by different attestation service providers such as ASP1 725 and ASP1 770, and abstracting over attestation protocols 708 and 720 using attestation manager 702 or 755, an extensible system is created. This extensible attestation system has the ability to add new services and protocols without the need to redesign or re-evaluate the entire system for each addition.

Selector 760 is the mechanism for enforcing the policy of the client by instantiating attestation protocols and attestation service providers that conform to the policy for a given scenario. Implementation 700 uses a method referred to as "Call by Contract" for selector 760.

Attestations may be chained across platform 700 by the use of attestation service provider ASP3 780 that makes attestation requests 785 to another M&A environment 702 and relays or uses the attestation responses. With reference to FIG. 6, FIG. 7 depicts a composable set of components 700 that can be used in an attestation, including an attestation service provider in user M&A service 628 which makes an attestation request to supervisor M&A service 612, enabling attestations which satisfy the requirements of the attestation architecture.

Attestation protocols within M&A 612 or and 628 may demand attestation requests/responses 740 as well as providing responses 785, and may use attestation service providers for verification of the properties asserted by such attestations.

IV. Example Computer System Implementation

Figure 8:
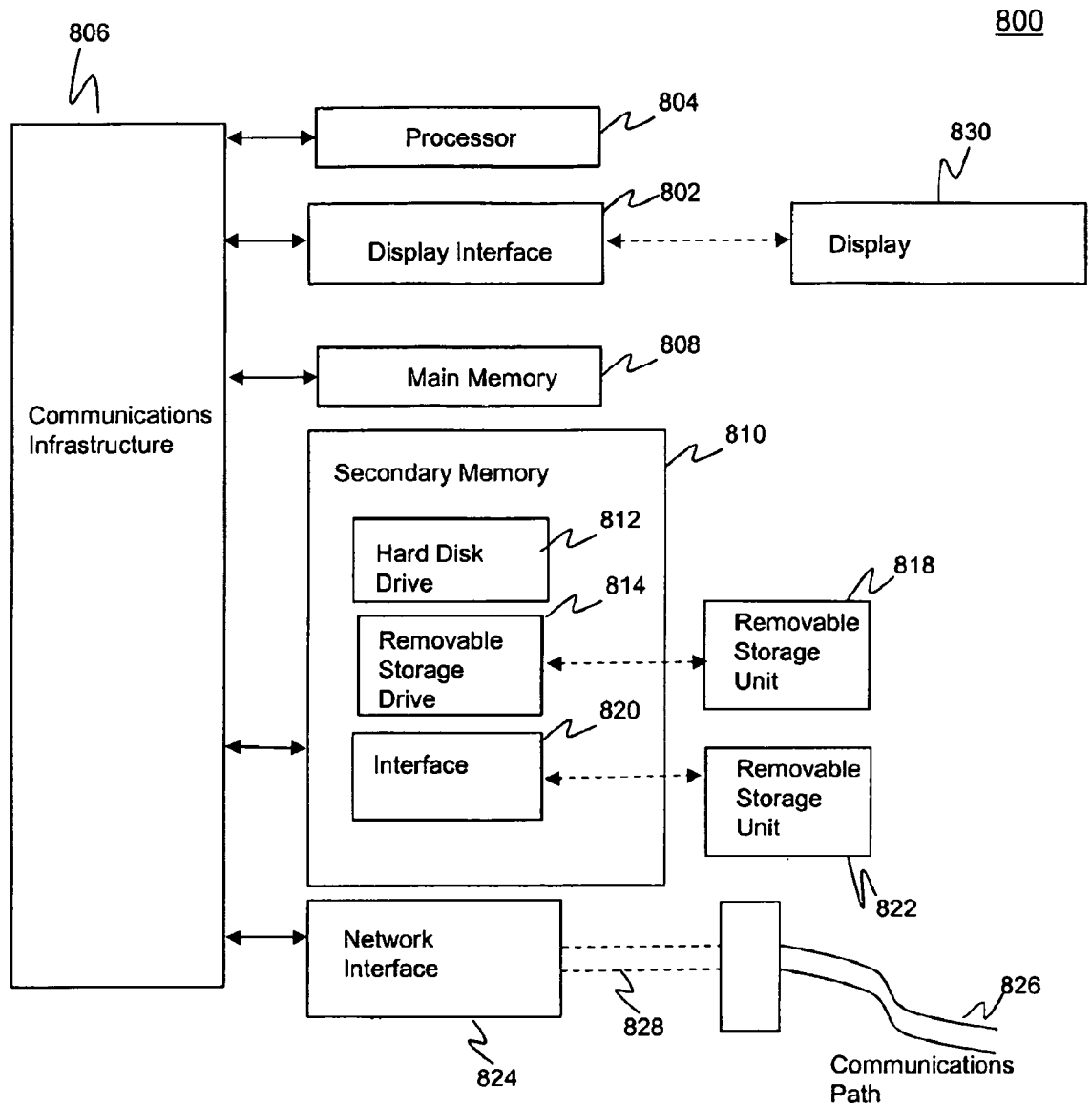
FIG. 8 depicts an example computer system in which the present invention may be implemented.

Various aspects of the present invention can be implemented by software, firmware, hardware, or a combination thereof. FIG. 8 illustrates an example computer system 800 in which the present invention, or portions thereof, can be implemented as computer-readable code. For example, the methods illustrated by flowchart 400 of FIG. 4 can be implemented in system 800. Various embodiments of the invention are described in terms of this example computer system 800. After reading this description, it will become apparent to a person skilled in the relevant art how to implement the invention using other computer systems and/or computer architectures.

Computer system 800 includes one or more processors, such as processor 804. Processor 804 can be a special purpose or a general purpose processor. Processor 804 is connected to a communication infrastructure 806 (for example, a bus or network).

Computer system 800 also includes a main memory 808, preferably random access memory (RAM), and may also include a secondary memory 810. Secondary memory 810 may include, for example, a hard disk drive 812, a removable storage drive 814, and/or a memory stick. Removable storage drive 814 may comprise a floppy disk drive, a magnetic tape drive, an optical disk drive, a flash memory, or the like. The removable storage drive 814 reads from and/or writes to a removable storage unit 818 in a well known manner. Removable storage unit 818 may comprise a floppy disk, magnetic tape, optical disk, etc. which is read by and written to by removable storage drive 814. As will be appreciated by persons skilled in the relevant art(s), removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 are in the form of signals which may be electronic, electromagnetic, optical, or other signals capable of being received by communications interface 824. These signals are provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Signals carried over communications path 826 can also embody the logic described herein. Computer program medium and computer usable medium can also refer to memories, such as main memory 808 and secondary memory 810, which can be memory semiconductors (e.g. DRAMs, etc.). These computer program products are means for providing software to computer system 800.

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable processor 804 to implement the processes of the present invention, such as the steps in the methods illustrated by flowchart 400 of FIG. 4 discussed above. Accordingly, such computer programs represent controllers of the computer system 800. Where the invention is implemented using software, the software may be stored in a computer program product and loaded into computer system 800 using removable storage drive 814, interface 820, hard drive 812, or communications interface 824.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for making trust decisions regarding a target system, the method comprising:
    (a) receiving an attestation request at the target system, wherein the attestation request includes queries regarding specific dynamic properties of the target system needed by an appraiser to make trust decisions regarding the target system, and wherein the attestation request contains a subset of information contained in an original request from the appraiser;
    (b) sending the attestation request from the target system to an attester, wherein sending the attestation request from the target system to the attester comprises sending a subset of information contained in the attestation request to the attester;
    (c) collecting information regarding the specific dynamic properties by invoking measurement agents that perform measurements on software executing on the target system, wherein the collected information corresponds to the subset of information sent from the target system to the attester;
    (d) sending an attestation response from the attester to the appraiser, wherein the response includes at least information regarding the specific dynamic properties of the target system requested by the appraiser in step (a) and information regarding the reliability of the attestation response, wherein the information regarding the reliability of the attestation response identifies an attestation architecture of the attester; and (e) making a trust decision at the appraiser regarding the target system based on the information regarding the specific dynamic properties and the reliability of the attestation response contained in the attestation response.

2. The method of claim 1, wherein step (a) comprises sending an encrypted attestation request from an appraiser to a target system.

3. The method of claim 1, further comprising re-evaluating the trust decision of step (e) by repeating steps (a)-(d).

4. The method of claim 3, wherein the re-evaluating is performed periodically.

5. The method of claim 1, wherein step (d) comprises sending an attestation response that is resistant to tampering.

6. The method of claim 5, wherein the attestation response is encrypted.

7. The method of claim 5, wherein the attestation response contains a digital signature from the attester.

8. The method of claim 1, wherein the target system resides on the same physical host as the attester.

9. The method of claim 8, wherein there is a separation property causing the target system and the attester to be effectively different principals.

10. The method of claim 1, wherein sending the attestation request comprises sending the attestation request to an attester residing on a same host as the target system.

11. A method for making trust decisions regarding a target system, the method comprising:

(a) sending a first attestation request from an appraiser to an intermediate attester, wherein the first request includes queries regarding specific dynamic properties of the target system needed by the appraiser to make trust decisions regarding the target system;

(b) receiving the first attestation request at the intermediate attester;

(c) modifying the first attestation request at the intermediate attester to generate a second attestation request comprising a subset of the information contained in the first attestation request;

(d) sending the second attestation request from the intermediate attester to the target system;

(e) receiving the second attestation request at the target system;

(f) forwarding the second attestation request from the target system to an attester, wherein forwarding the attestation request from the target system to the attester comprises sending a subset of information contained in the attestation request to the attester;

(g) collecting information regarding the specific dynamic properties by invoking measurement agents that perform measurements on software executing on the target system, wherein the collected information corresponds to the subset of information forwarded from the target system to the attester;

(h) sending a first attestation response from the attester to the intermediate attester, wherein the first response includes at least information regarding the specific dynamic properties of the target system requested by the appraiser in step (a) and information regarding the reliability of the attestation response, wherein the information regarding the reliability of the attestation response identifies an attestation architecture of the attester;

(i) modifying the first attestation response at the intermediate attester;

(j) sending a second attestation response from the intermediate attester to the appraiser; and (k) making a trust decision at the appraiser regarding the target system based on information regarding the specific dynamic properties and the reliability of the attestation response contained in the second attestation response.

12. The method of claim 11, further comprising re-evaluating the trust decision of step (k) by repeating steps (a)-(j).

13. The method of claim 12, wherein the re-evaluating is performed periodically.

14. The method of claim 11, wherein step (a) comprises sending an encrypted attestation request from an appraiser to an intermediate attester.

15. The method of claim 11, wherein the modifying in step (i) comprises modifying the first attestation response to exclude some detailed platform and host-specific measurements for the target system.

16. The method of claim 15, wherein the second attestation response includes at least a time-stamped message claiming that the target system has some given abstract property that the appraiser requires in order to trust the target system.

17. The method of claim 11, wherein step (j) comprises sending a second attestation response that is resistant to tampering.

18. The method of claim 17, wherein the second attestation response is encrypted.

19. The method of claim 17, wherein the second attestation response contains a digital signature from the attester.

20. The method of claim 11, wherein the target system resides on the same physical host as the attester.

21. The method of claim 20, wherein there is a separation property causing the target system and the attester to be effectively different principals.

22. The method of claim 11, wherein forwarding the second attestation request comprises forwarding the second attestation request to an attester residing on the same host as the target system.

23. A computer program product comprising a non-transitory computer usable medium having computer program logic recorded thereon for enabling a processor to perform operations to make trust decisions regarding a target system, the operations comprising:

sending an attestation request to the target system, wherein the attestation request contains a subset of information contained in an original request from an appraiser;

receiving the attestation request from an appraiser at the target system, wherein the request includes queries regarding specific dynamic properties of the target system needed by the appraiser to make trust decisions regarding the target system;

sending the attestation request from the target system to an attester, wherein sending the attestation request from the target system to the attester comprises sending a subset of information contained in the attestation request to the attester;

collecting information regarding the specific dynamic properties by invoking measurement agents that perform measurements on software executing on the target system, wherein the collected information corresponds to the subset of information sent from the target system to the attester;

sending an attestation response from the attester to the appraiser, wherein the attestation response includes information regarding the reliability of the attestation response, wherein the information regarding the reliability of the attestation response identifies an attestation architecture; and making a trust decision at the appraiser regarding the target system based on information regarding the specific dynamic properties and the reliability of the attestation response contained in the attestation response.

24. The computer program product of claim 23, wherein the operation of sending the attestation request comprises sending the attestation request to an attester residing on a same host as the target system.

25. A system capable of making trust decisions regarding a target system, comprising:
one or more processors; and
a memory configured to store computer instructions that, when executed by the one or more processors, cause the one or more processors to:
send an attestation request from an appraiser to the target system, wherein the attestation request comprises a subset of information contained in an original request from the appraiser;
receive an attestation request from the appraiser at a target system, wherein the request includes queries regarding specific dynamic properties of the target system needed by the appraiser to make trust decisions regarding the target system;
send the attestation request from the target system to an attester, wherein sending the attestation request from the target system to the attester comprises sending only a subset of information contained in the attestation request to the attester;
collect information regarding the specific dynamic properties by invoking measurement agents that perform measurements on software executing on the target system, wherein the collected information corresponds to the subset of information sent from the target system to the attester;
send an attestation response from the attester to the appraiser, wherein the attestation response includes information regarding the reliability of the attestation response, wherein the information regarding the reliability of the attestation response identifies an attestation architecture; and
make a trust decision at the appraiser regarding the target system based on information regarding the specific dynamic properties and the reliability of the attestation response contained in the attestation response.

26. The system of claim 25, wherein the computer instructions are configured to cause the one or more processors to send the attestation request by sending the attestation request to an attester residing on a same host as the target system.

* * * * *